United States Patent
Jang et al.

(10) Patent No.: US 6,345,131 B1
(45) Date of Patent: Feb. 5, 2002

(54) METHOD FOR MANUFACTURING THE THERMO-OPTIC SWITCH, AND METHOD FOR CHANGING OPTICAL LINE USING THE THERMO-OPTIC SWITCH

(75) Inventors: Woo-Hyuk Jang, Yongin-shi; Hyun-Ki Kim, Osan-shi; Jung-Hee Kim; Yong-Woo Lee, both of Seoul; Tae-Hyung Rhee, Songnam-shi, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 37 days.

(21) Appl. No.: 09/598,292

(22) Filed: Jun. 21, 2000

(30) Foreign Application Priority Data

Jun. 21, 1999 (KR) ............................................ 99-23274

(51) Int. Cl.$^7$ ................................................. G02B 6/42
(52) U.S. Cl. ................................. 385/16; 385/2; 385/4; 385/8; 385/43; 385/45; 385/49
(58) Field of Search ................................. 385/1, 2, 4, 8, 385/9, 11, 10, 12, 14, 15, 16, 23, 24, 27, 28, 39, 40, 41, 42, 43, 45

(56) References Cited

U.S. PATENT DOCUMENTS

| | | | |
|---|---|---|---|
| 5,121,450 A | 6/1992 | Eichen et al. | 385/22 |
| 5,418,868 A | 5/1995 | Cohen et al. | 385/16 |
| 5,623,566 A | 4/1997 | Lee et al. | 385/24 |
| 5,970,186 A | 10/1999 | Kenney et al. | 385/16 |
| 6,052,397 A | * 4/2000 | Jeon | 438/31 |
| 6,067,387 A | * 5/2000 | Oh et al. | 385/2 |

OTHER PUBLICATIONS

T. Brenner & H. Melchoir, Integrated Optical Modeshape Adapters in InGaAsP/InP for Efficient Fiber–to–Waveguide Coupling, Sep. 1993, IEEE Photonics Technology Letters, vol. 5, No. 9.*

* cited by examiner

Primary Examiner—Brian Healy
Assistant Examiner—Kevin S Wood
(74) Attorney, Agent, or Firm—Robert E. Bushnell, Esq.

(57) ABSTRACT

A thermo-optic switch using a small drive power while exhibiting a reduction in the coupling loss caused by the coupling to optical fibers and a switch speed of several hundred microseconds or less. A method for manufacturing the thermo-optic switch and a method for changing an optical line switching using the thermo-optic switch are also disclosed. The thermo-optic switch includes a substrate having etched portions at regions respectively corresponding to input and output terminals of the thermo-optic switch, a lower clad layer formed over the substrate, the lower clad layer having an input taper formed at the region corresponding to the input terminal and adapted to convert a circular mode, input from an optical fiber connected to the input terminal, into an oval mode having a rib shape, and an output taper formed at the region corresponding to the output terminal and adapted to convert the oval mode into a circular mode allowed to be input to an optical fiber connected to the output terminal, a core layer formed over the lower clad layer and provided with branched waveguides having a rib structure, the branched waveguides selectively receiving the oval mode from the input taper and outputting the received oval mode to the output taper, an upper clad layer formed over the core layer, and switching electrodes formed on the upper clad layer and selectively activated to apply heat to an associated one of the branched waveguides in such a fashion that an effective refractive index difference occurs between the branched waveguides, thereby causing the branched waveguides to selectively receive the oval mode from the input taper.

19 Claims, 7 Drawing Sheets

METHOD FOR MANUFACTURING THE THERMO-OPTIC SWITCH, AND METHOD FOR CHANGING OPTICAL LINE USING THE THERMO-OPTIC SWITCH

CLAIM OF PRIORITY

This application makes reference to, incorporates the same herein, and claims all benefits accruing under 35 U.S.C §119 from an application entitled THERMO-OPTIC SWITCH AND METHOD OF FORMING THE SAME earlier filed in the Korean Industrial Property Office on Jun. 21, 1999, and there duly assigned Serial No. 99-23274 by that Office.

BACKGROUND OF THE INVENTION

1. Field of the Invention

The present invention relates to an optical switch, and more particularly to a thermo-optic switch using a small drive power while exhibiting a reduction in the coupling loss caused by the coupling to optical fibers and a switch speed of several hundred microseconds or less. The present invention also relates to a method for manufacturing the thermo-optic switch and a method for changing an optical line switching using the thermo-optic switch.

2. Description of the Related Art

Examples of optical switches, thermo-optic switches, or electro-optic switches, incorporated by reference herein, are found in U.S. Pat. No. 5,121,450 to Elliot Eichen et al. entitled *Fiber Optical Y-Junction*, U.S. Pat. No. 5,418,868 to Leonard G. Cohen et al. entitled *Thermally Activated Optical Switch*; U.S. Pat. No. 5,623,566 to Hyung J. Lee et al. entitled *Network With Thermally Induced Waveguide*, U.S. Pat. No. 5,970,186 to John T. Kenney et al. entitled *Hybrid Digital Electro-Optic Switch*, and U.S. Pat. No. 6,067,387 to Min Cheol Oh et al. entitled *Electro-Optic Polymer Waveguide Device For Decreasing Driving Voltage And An Optical Loss And Method Of Making The Same*.

Generally, a thermo-optic switch is a device for changing an optical line using a variation in the refractive index of the material of the device depending on a variation in temperature applied to it, the material of the device. Thermo-optic switches are mainly classified into a Mach-Zehnder interference type, a directional coupler type, and a digital type.

Figure 1:
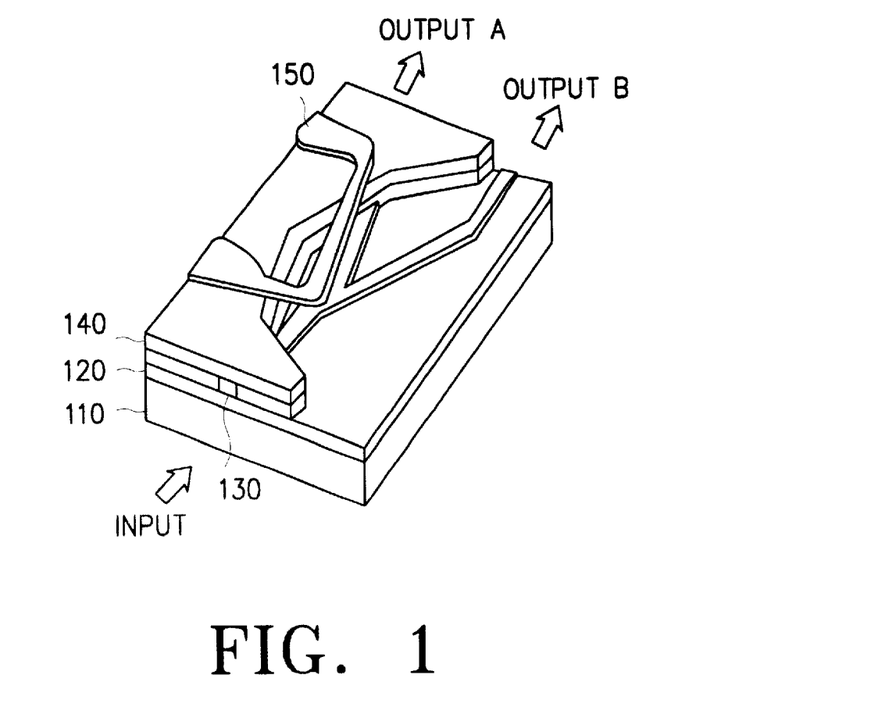
FIG. 1 is a schematic perspective view illustrating an example of a digital thermo-optic switch.

FIG. 1 illustrates an example of a digital thermo-optic switch. As shown in FIG. 1, the digital thermo-optic switch includes a substrate 10, a lower clad layer 120, a core layer 130, an upper clad layer 140, and a heater 150.

Figure 2:
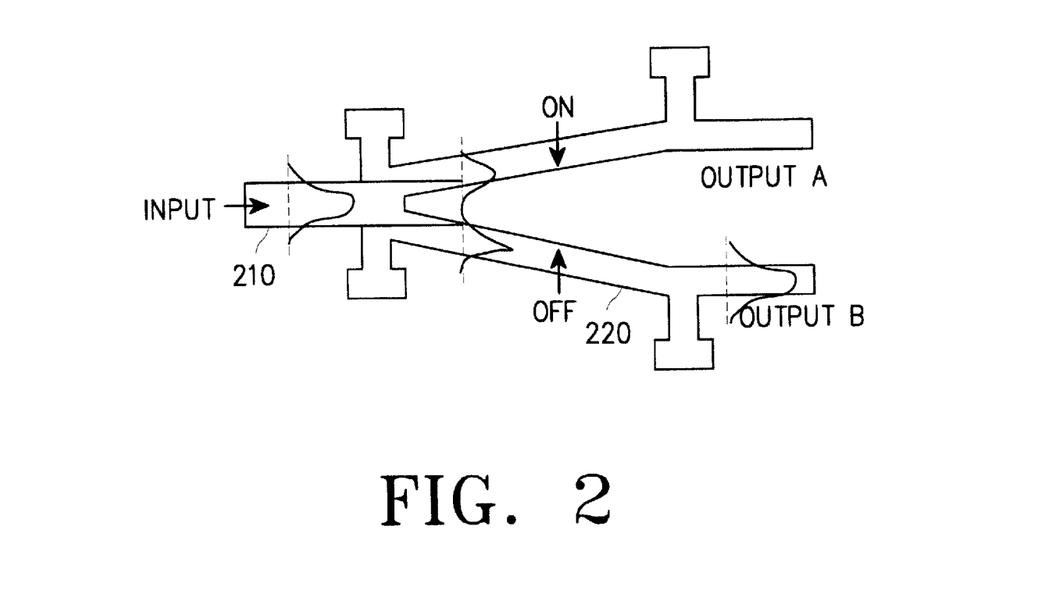
FIG. 2 is a schematic view illustrating the operation principle of a digital thermo-optic switch using a mode evolution principle.

FIG. 2 is a schematic view illustrating the operation principle of a digital thermo-optic switch using a mode evolution principle. The digital thermo-optic switch has a branched waveguide structure having branched waveguides 210. Electrodes 220, which are made of a metal, such as gold, exhibiting a superior thermal conductivity, are formed on each branched waveguide 210. When heat is applied to one of the electrodes 220, it is transferred from the electrode 220 to the branched waveguide 210 arranged beneath the electrode 220, so that the branched waveguide 210 exhibits a reduced effective refractive index. As a result, a difference of effective refractive index occurs between the branched waveguides 210. Accordingly, an input light is switched to the branched waveguide 210 in accordance with a mode evolution thereof. In Mach-Zehnder interference or directional coupler type thermo-optic switches using an inter-mode interference phenomenon, a light switching operation is achieved by virtue of a line length difference between two branched waveguides resulting from a difference between the effective refractive indices of those branched waveguides.

Thermo-optic switches may be implemented using waveguides having an embedded structure or a rib structure. A thermo-optic switch, which has the embedded structure, is manufactured using materials exhibiting a refractive index difference ranged from 0.3% to 0.6% in order to reduce the coupling loss caused by the coupling to optical fibers. Typically, the thermo-optic switch has a core thickness of 6 to 8 μm and a total waveguide thickness of 25 to 40 μm. In this case, an optical fiber coupling loss of 0.5 dB/facet or less is exhibited.

Figure 3:
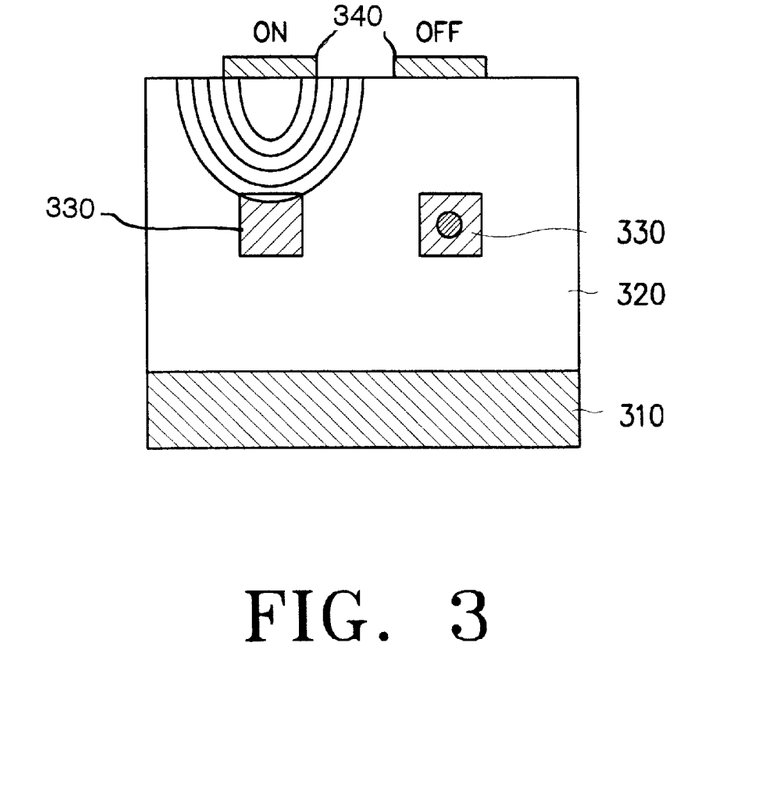
FIG. 3 is cross-sectional view illustrating a thermo-optic switch having the embedded structure.

FIG. 3 illustrates a cross section of the thermo-optic switch having the embedded structure. As shown in FIG. 3, the thermo-optic switch includes a heat sink 310, a clad 320, branched waveguide cores 330, and electrodes 340. In such a thermo-optic switch having the above mentioned embedded structure, heat applied to one of the electrodes 340 is transferred to an associated one of branched waveguide cores 330 in a thickness direction in an isotropic fashion. For this reason, where the thermo-optic switch has a large total waveguide thickness, heat is not only transferred to a desired one of the waveguides, but also transferred to the remaining waveguide in a considerable amount. As a result, it is difficult to obtain an efficient thermo-optic effect. Furthermore, the transfer of heat to the heat sink 310 arranged beneath the waveguides is carried out at a lowered rate. For this reason, the time taken for the applied heat to be completely discharged out of the waveguides is also unacceptably lengthened. In other words, the switching speed of this type of thermo-optic switch is too slow.

Figure 4:
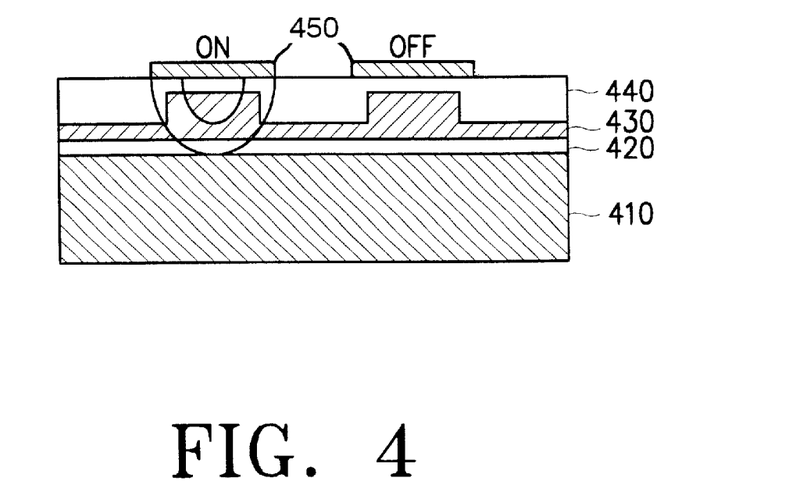
FIG. 4 is a cross-sectional view illustrating a thermo-optic switch having the rib structure.

FIG. 4 is a cross-sectional view illustrating a thermo-optic switch having the rib structure. As shown in FIG. 4, the thermo-optic switch includes a heat sink 410, a lower clad 420, a core 430, an upper clad 440, and electrodes 450. In the case of thermo-optic switches, which have the rib structure, materials exhibiting a refractive index difference ranged from 1% to 10% are typically it used. Where materials exhibiting a high refractive index difference are used to manufacture a thermo-optic switch having the rib structure, it is possible to obtain a total waveguide thickness of 15 μm or less because the clad of the thermo-optic switch affected by an evanescent field formed in the thickness direction of the waveguides can be formed to be very thin. In this case, accordingly, heat applied to one of the electrodes 450 is transferred only to a desired one of the waveguides of core 430. As a result, it is possible to greatly reduce the transfer of heat to the remaining waveguide. Since the total waveguide thickness corresponds to ½ the total waveguide thickness in the general embedded structure, the distance between each electrode and the heat sink is correspondingly short. As a result, an easy heat discharge is obtained. In addition, the drive power used for the thermo-optic switch can be considerably reduced. There is a disadvantage, however, in that a large coupling loss occurs in the thermo-optic switch having the rib structure due to a mode size difference from optical fibers to which the thermo-optic switch is coupled. For this reason, it is difficult to manufacture a thermo-optic switch having a small coupling loss.

As is apparent from the above description, thermo-optic switches, which have an embedded structure or a rib structure, have the following problems. That is, in the case of a thermo-optic switch having the embedded structure, which has an advantage in that the coupling loss caused by the coupling to optical fibers can be reduced to 0.5 dB/facet or less, it is difficult to achieve an efficient switching operation because the distance between each electrode and each associated waveguide is considerably large because of a large total waveguide thickness of 25 to 40 $\mu$m. As a result, the thermo-optic switch exhibits a relatively low switching speed. In the case of a thermo-optic switch having the rib structure, it can have a small total thickness of 10 $\mu$m or less by virtue of a high refractive index difference exhibited in the rib structure. Accordingly, the drive power used in the thermo-optic switch can be reduced, as compared to that used in the thermo-optic switch having the embedded structure. Also, there is an improvement in switching speed. However, the thermo-optic switch having the rib structure has a disadvantage in that a large coupling loss occurs due to a mode size difference from optical fibers to which the thermo-optic switch is coupled. For this reason, it is difficult to manufacture a proficient thermo-optic switch having a small coupling loss.

SUMMARY OF THE INVENTION

Therefore, an object of the invention is to provide an improved thermo-optic switch.

Another object of the invention is to provide a thermo-optic switch which has a rib structure exhibiting a coupling loss, caused by the coupling to optical fibers, reduced to 0.5 dB/facet or less and having a reduced distance between each electrode thereof and a heat sink thereof, so that it is capable of using a small drive power while exhibiting a switching speed of several hundred microseconds, and to provide a method for manufacturing the thermo-optic switch.

Yet another object of the invention is to provide a method for manufacturing a thermo-optic switch which has a rib structure exhibiting a reduced coupling loss.

A further object of the invention is to provide a method for changing an optical line using the thermo-optic switch.

In accordance with one aspect, the present invention provides a thermo-optic switch having input and output terminals respectively connected to optical fibers, comprising: a substrate having etched portions at regions respectively corresponding to the input and output terminals; a lower clad layer formed over the substrate, the lower clad layer having an input taper formed at the region corresponding to the input terminal and adapted to convert a circular mode, input from the optical fiber connected to the input terminal, into an oval mode having a rib shape, and an output taper formed at the region corresponding to the output terminal and adapted to convert the oval mode into a circular mode allowed to be input to the optical fiber connected to the output terminal; a core layer formed over the lower clad layer and provided with branched waveguides having a rib structure, the branched waveguides selectively receiving the oval mode from the input taper and outputting the received oval mode to the output taper; an upper clad layer formed over the core layer; and switching electrodes formed on the upper clad layer and selectively activated to apply heat to an associated one of the branched waveguides in such a fashion that an effective refractive index difference occurs between the branched waveguides, thereby causing the branched waveguides to selectively receive the oval mode from the input taper.

In accordance with another aspect, the present invention provides a method for manufacturing a thermo-optic switch having input and output terminals, comprising the steps of: (a) preparing a substrate, and etching portions of the substrate respectively corresponding to the input and output terminals; (b) forming a lower clad layer over the substrate; (e) forming an input taper and an output taper at portions of the lower clad layer respectively corresponding to the input and output terminals; (d) forming a core layer over the lower clad layer formed with the input and output tapers; (e) forming branched waveguides having a rib structure at the core layer in such a fashion that the branched waveguides are arranged between the input and output tapers; (f) forming an upper clad layer over the core layer formed with the branched waveguides; and (g) forming switching electrodes on the upper clad layer.

In accordance with another aspect, the present invention provides a thermo-optic switch having input and output terminals respectively connected to optical fibers, comprising: a substrate having an input taper formed at a region corresponding to the input terminal and adapted to mode conversion by converting a circular mode, input from the optical fiber connected to the input terminal, into a flattened mode, or oval mode having a rib shape, and an output taper formed at the region corresponding to the output terminal and adapted to convert the oval mode into a circular mode allowed to be input to the optical fiber connected to the output terminal; a lower clad layer formed over the substrate; a core layer formed over the lower clad layer and provided with branched waveguides having a rib structure, the branched waveguides selectively receiving the oval mode from the input taper and outputting the received oval mode to the output taper; an upper clad layer formed over the core layer; and switching electrodes formed on the upper clad layer and selectively activated to apply heat to an associated one of the branched waveguides in such a fashion that an effective refractive index difference occurs between the branched waveguides, thereby causing the branched waveguides to selectively receive the oval mode from the input taper.

In accordance with another aspect, the present invention provides a method for manufacturing a thermo-optic switch having input and output terminals, comprising the steps of: (a) preparing a substrate, and forming an input taper and an output taper at portions of the substrate respectively corresponding to the input and output terminals; (b) forming a lower clad layer over the substrate; (c) forming a core layer over the lower clad layer; (d) forming branched waveguides having a rib structure at the core layer in such a fashion that the branched waveguides are arranged between the input and output tapers; (e) forming an upper clad layer over the core layer formed with the branched waveguides; and (f) forming switching electrodes on the upper clad layer.

In accordance with another aspect, the present invention provides a method for changing an optical line using a thermo-optic switch having input and output tapers respectively coupled to optical fibers, branched waveguides having a rib structure arranged between the input and output tapers, and electrodes adapted to allow the branched waveguides to be selectively switched to the input and output tapers, comprising the steps of: (a) converting a circular mode, input from the input taper-end optical fiber to the input taper, into an oval mode having a rib shape; (b) activating a selected one of the electrodes, thereby generating heat from the selected electrode, and transferring the heat to a selected one of the branched waveguides in the vicinity of a branching point of the waveguides, at which the waveguides are coupled to the input taper, thereby switching the optical line for the oval mode to the branched waveguide, to which no heat is applied, by virtue of a mode evolution; and (c) changing the oval mode having the rib shape into a circular mode, corresponding to the output taper-end optical fiber, during a passage of the oval mode through the output taper.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 5A:
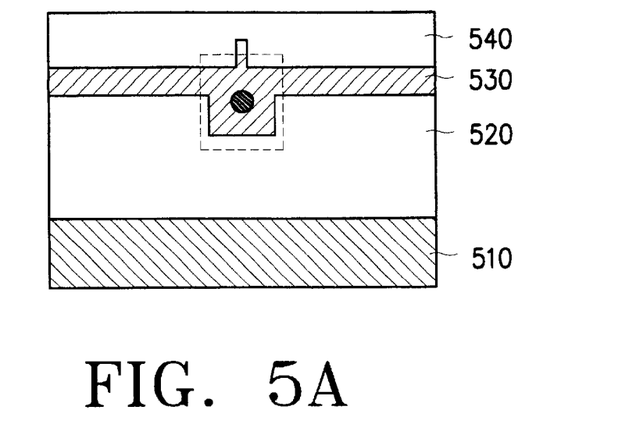
FIG. 5A cross-sectional view illustrating input and output terminals of a thermo-optic switch having a rib structure according to the present invention.
Figure 5B:
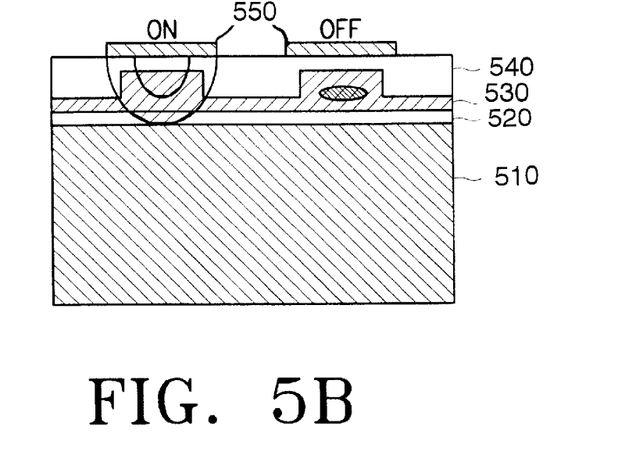
FIG. 5B is a cross-sectional view illustrating a branching region of the thermo-optic switch having the rib structure according to the present invention.

FIGS. 5A and 5B are cross-sectional views respectively illustrating input and output terminals of a thermo-optic switch having a rib structure according to the present invention.

As shown in FIGS. 5A and 5B, the thermo-optic switch includes a substrate 510, a lower clad layer 520, a core layer 530, an upper clad layer 540, and electrodes 550. The substrate 510 is comprised of a silicon substrate and adapted to be used as a heat sink. The substrate 510 has etched structures at desired portions thereof. That is, the substrate 510 is etched to a depth of 10 to 15 $\mu$m at a portion thereof, corresponding to an input terminal of the thermo-optic switch, where an input taper is to be arranged. The substrate 510 is also etched to a depth of 10 to 15 $\mu$m at a portion thereof, corresponding to an output terminal of the thermo-optic switch, where an output taper is to be arranged. The lower clad layer 520 is formed on etched portions of the input and output tapers and made of a material exhibiting a refractive index difference of 1 to 2% with respect to the core layer 530. The core layer 530 is formed with a waveguide pattern having a rib structure. The upper clad layer 540 is made of a material exhibiting a refractive index difference of 1 to 15% with respect to the core layer 530. The electrodes 550 are formed by depositing a conductive metal film over the upper clad layer 540, and patterning the conductive metal film using photolithography and etching processes.

Referring to FIGS. 6A to 6G, a procedure for manufacturing the thermo-optic switch having the above mentioned structure in accordance with an embodiment of the present invention is illustrated, respectively.

Figure 6A:
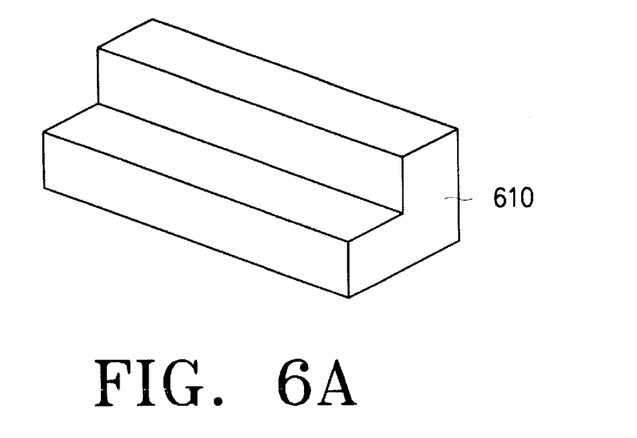
FIGS. 6A to 6G are prespective views respectively illustrating a procedure for manufacturing the thermo-optic switch having the rib structure in accordance with an embodiment of the present invention.
Figure 6B:
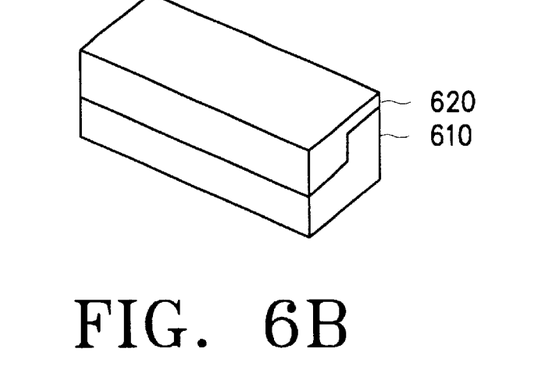
Figure 6C:
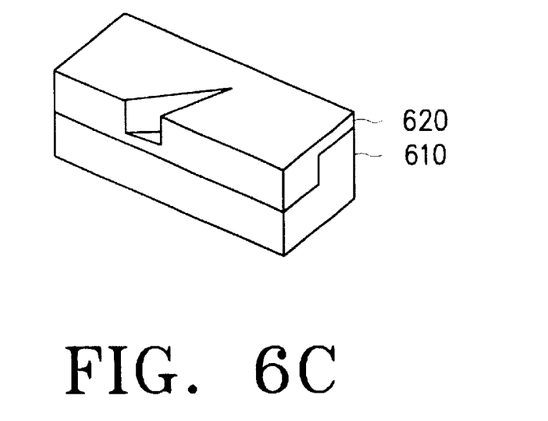
Figure 6D:
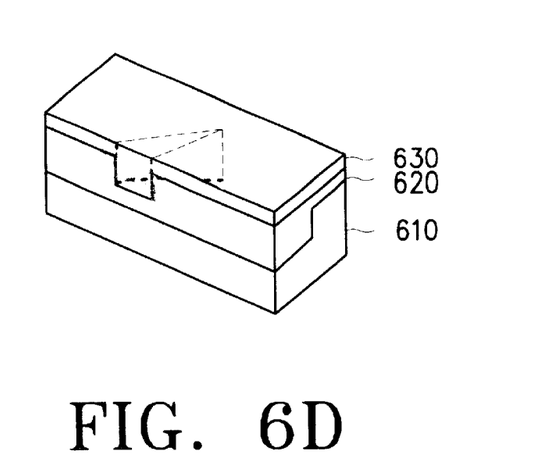
Figure 6E:
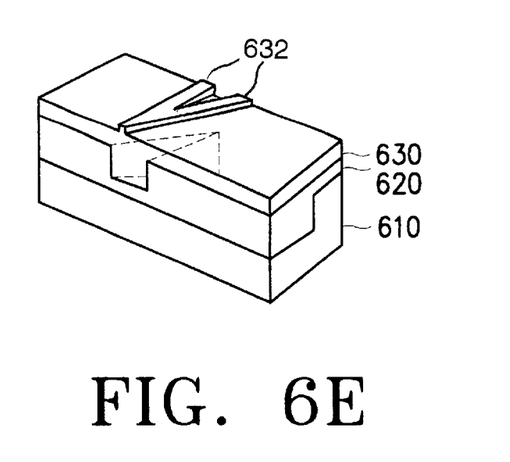
Figure 6F:
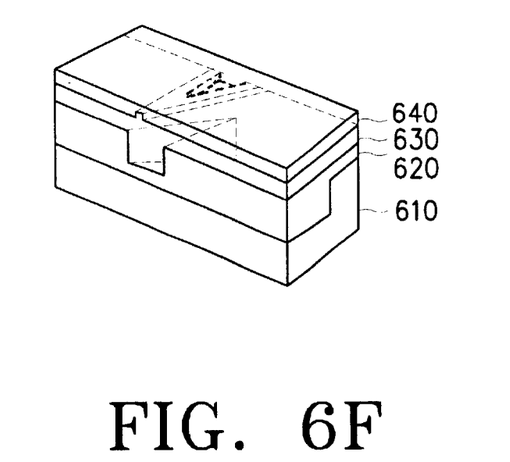
Figure 6G:
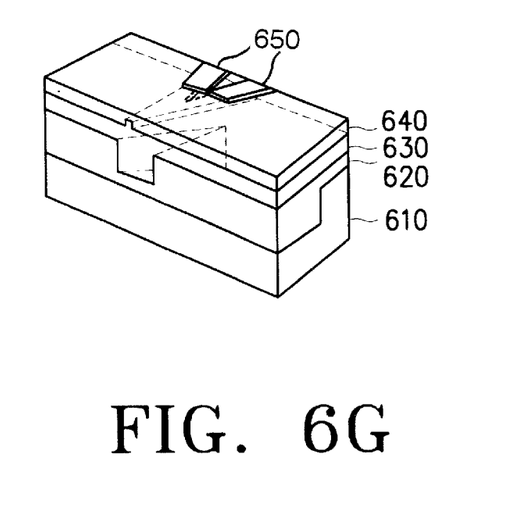

In accordance with the manufacturing method, a substrate 610, which is to be used as a heat sink, is first prepared. As shown in FIG. 6A, the substrate 610 is then etched to a depth of 10 to 15 $\mu$m at portions thereof, corresponding to input and output terminals of the thermo-optic switch, where input and output tapers are to be arranged, respectively. A lower clad layer 620 is then formed over the substrate 610, as shown in FIG. 6B. Thereafter, the lower clad layer 620 is etched using photolithography and etching processes, thereby forming input and output tapers as shown in FIG. 6C. As shown in FIG. 6D, a core layer 630 is then formed over the lower clad layer 620 formed with the input and output tapers, by use of a material exhibiting a refractive index difference of 1 to 2% with respect to the lower clad layer 620. Subsequently, the core layer 630 is etched using photolithography and etching processes, thereby forming branched waveguides of a rib structure, as shown in FIG. 6E. As shown in FIG. 6F, an upper clad layer 640 is then formed over the core layer 630 having the branched waveguides of the rib structure, by use of a material exhibiting a refractive index difference of 1 to 15% with respect to the core layer 630. A conductive metal film is then formed over the upper clad layer 640. The conductive metal film is subjected to photolithography and etching processes, thereby forming electrodes 650 as shown in FIG. 6G.

FIGS. 7A to 7F illustrate a procedure for manufacturing the thermo-optic switch in accordance with another embodiment of the present invention, respectively.

Figure 7A:
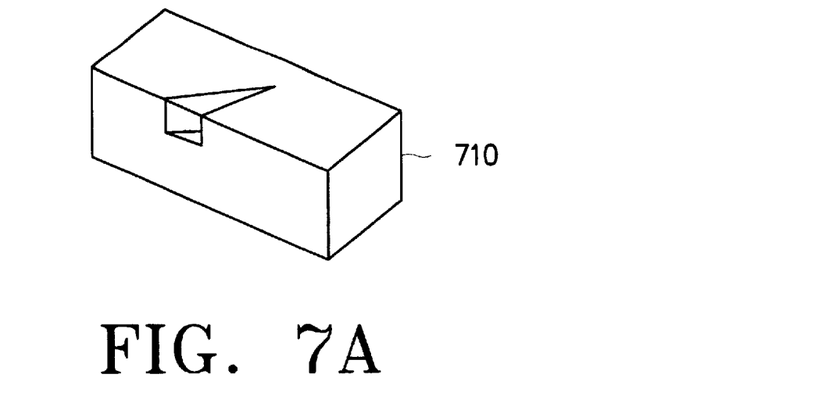
FIGS. 7A to 7F are cross-sectional views respectively illustrating a procedure for manufacturing the thermo optic switch having the rib structure in accordance with another embodiment of the present invention.
Figure 7B:
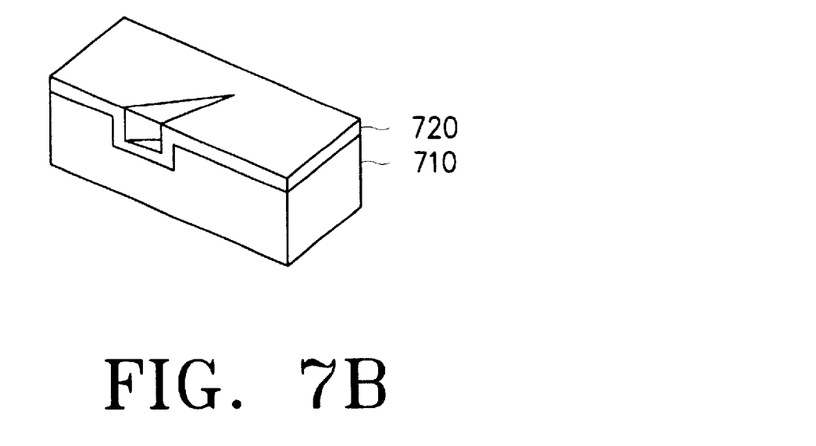
Figure 7C:
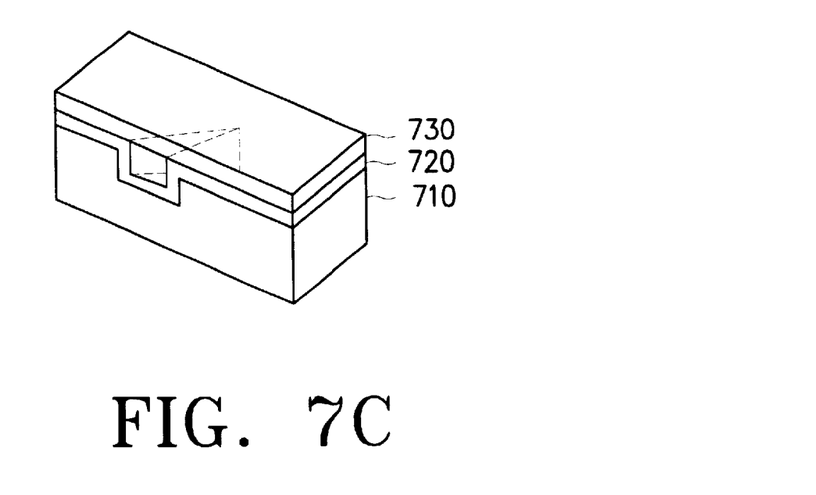
Figure 7D:
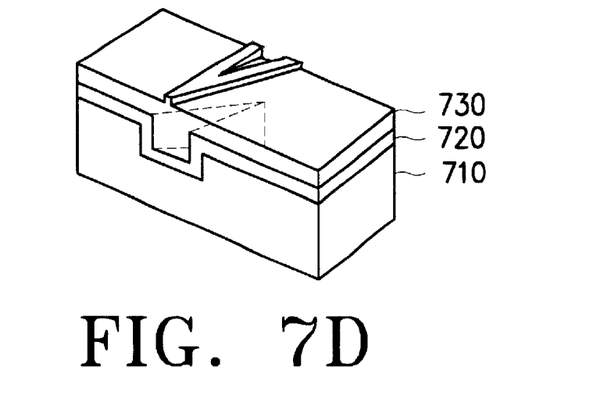
Figure 7E:
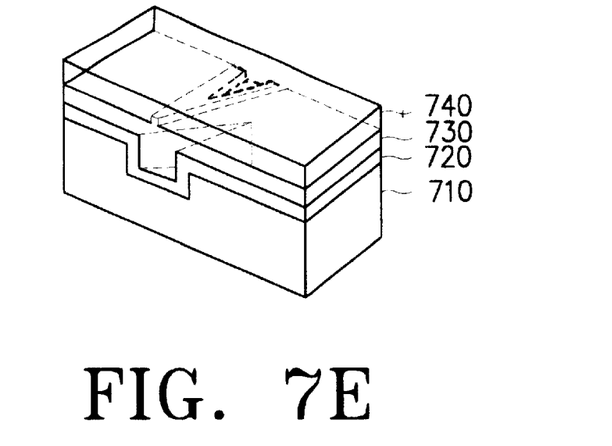
Figure 7F:
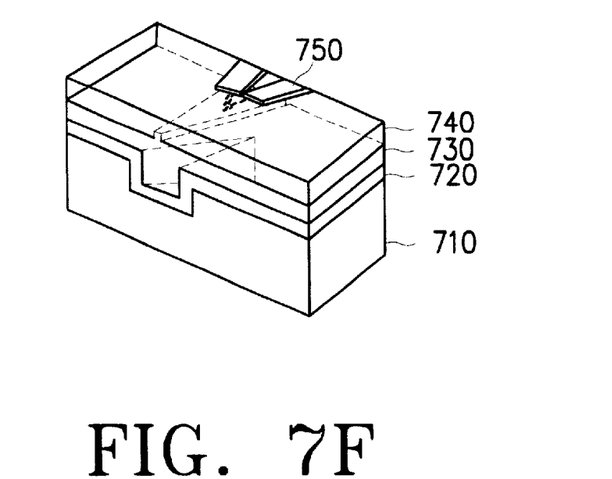

In accordance with this manufacturing method, a silicon substrate 710 is first prepared which is to be used as a heat sink. As shown in FIG. 7A, the silicon substrate 710 is subjected to photolithography and etching processes so that it is etched to a depth of 10 to 15 $\mu$m at portions thereof corresponding to input and output terminals of the thermo-optic switch, thereby forming input and output tapers, respectively. The silicon substrate 710 formed with the input and output tapers is then loaded in a heating furnace, heated to a temperature 1,000 to 2,000° C. in an oxygen atmosphere formed by oxygen blown into the heating furnace, and maintained for a desired period of time. In accordance with this treatment, a lower clad layer 720 made of SiO, is formed over the silicon substrate 710, as shown in FIG. 7B. Preferably, the $SiO_2$ layer has a thickness of 1.5 to 5 $\mu$m. As shown in FIG. 7C, a core layer 730 is then formed to a desired thickness over the lower clad layer 720 by use of a material exhibiting a refractive index difference of 1 to 2% with respect to the lower clad layer 720. Subsequently, the core layer 730 is etched using photolithography and etching processes, thereby forming branched waveguides of a rib structure, as shown in FIG. 7D. As shown in FIG. 7E, an upper clad layer 740 is then formed over the core layer 730 having the branched waveguides of the rib structure, by use of a material exhibiting a refractive index difference of 1 to 15% with respect to the core layer 730. A conductive metal film is then formed over the upper clad layer 740. The conductive metal film is subjected to photolithography and etching processes, thereby forming electrodes 750 as shown in FIG. 7F.

In accordance with the present invention, an optical line change method is also provided which is implemented using the thermo-optic switch manufactured as mentioned above. The optical line change method includes the following steps:

1. Light is input to the input taper of the thermo-optic switch which, in turn, converts an input circular mode, having a mode size similar to the mode of an optical fiber connected to the input taper, into an oval mode having a rib shape. By virtue of the taper structure of the input taper, the coupling loss exhibited at the input terminal of the thermo-optic switch coupled to the optical fiber is 0.5 dB/facet or less.

2. Heat is then applied to one of the electrodes. The applied heat is transferred from the heat-applied electrode to an associated one of the branched waveguides, having the rib structure, in the vicinity of the branching point of those waveguides at which the waveguides are connected to the input taper. As a result, the heat-transferred waveguide exhibits a reduced refractive index, as compared to the other waveguide. By virtue of a mode evolution, therefore, the optical line for the light is switched to the branched waveguide to which no heat is applied. In this case, a low drive power is consumed because heat is efficiently concentrated on a desired waveguide in that the thermo-optic switch is manufactured in such a fashion that the core of each branched waveguide and the associated electrode are spaced apart from each other by a small distance of 15 $\mu$m or less.

3. Where it is desired to switch the optical line to the heat-applied waveguide, the current flowing through the heat-applied electrode is cut off. At this time, the heat transferred from the heat-applied electrode to the associated waveguide is discharged into the heat sink arranged beneath the waveguide. Simultaneously, the other electrode is activated, so that heat is applied to the other waveguide. As a result, the optical line is switched to the other waveguide. The heat discharge is easily carried out because the branched waveguides are spaced apart from the heat sink by a very small distance. The switching time of the thermo-optic switch is several hundred microseconds or less.

4. The light travelling along the changed optical line then passes through the output taper of the thermo-optic switch connected to the branched waveguides. During the passage through the output taper, the light is converted from the oval mode having a rib shape, to the circular mode having a mode size similar to the mode of an optical fiber connected to the output taper. By virtue of the taper structure of the output taper, the coupling loss exhibited at the output terminal of the thermo-optic switch coupled to the optical fiber is 0.5 dB/facet or less.

The following Table 1 describes a comparison between the characteristics of the thermo-optic switch according to the present invention and the characteristics of a conventional thermo-optic switch having an embedded structure or a rib structure.

one of the electrodes is transferred only to a desired one of the waveguides. As a result, it is possible to greatly reduce the transfer of heat to the remaining waveguide. In addition, the drive power used for the thermo-optic switch can be considerably reduced.

While the present invention has been described in detail with reference to the specific embodiment, they are mere exemplary applications. Thus, it is to be clearly understood that many variations can be made by anyone skilled in the art within the scope and spirit of the present invention.

What is claimed is:

1. A thermo-optic switch having input and output terminals respectively connected to optical fibers, comprising:

a substrate having etched portions at regions respectively corresponding to the input and output terminals;

a lower clad layer formed over the substrate, the lower clad layer having an input taper formed at the region corresponding to the input terminal and adapted to convert a circular mode, input from the optical fiber connected to the input terminal, into an oval mode having a rib shape, and an output taper formed at the region corresponding to the output terminal and adapted to convert the oval mode into a circular mode allowed to be input to the optical fiber connected to the output terminal;

a core layer formed over the lower clad layer and provided with branched waveguides having a rib structure, the branched waveguides selectively receiving the oval mode from the input taper and outputting the received oval mode to the output taper;

an upper clad layer formed over the core layer; and switching electrodes formed on the upper clad layer and selectively activated to apply heat to an associated one of the branched waveguides in such a fashion that an effective refractive index difference occurs between the branched waveguides, thereby causing the branched waveguides to selectively receive the oval mode from the input taper.

2. The thermo-optic switch according to claim 1, wherein the substrate is a heat sink etched to a depth of 10 to 15 $\mu$m at regions where the input and output tapers are to be arranged, respectively.

3. A method for manufacturing a thermo-optic switch having input and output terminals, comprising the steps of:

TABLE 1

| | Refractive Index Difference | Coupling Loss | Switching Time | Drive Power/1*2 |
|---|---|---|---|---|
| Conventional Embedded Structure | 0.75% or less | 0.5 dB/facet or less | Several microseconds | 100 mW |
| Conventional Rib Structure | 1 to 10% | 0.5 dB/facet or less | Several hundred microseconds or less | 100 mW or less |
| Structure of Present Invention | 1% or more | 0.5 dB/facet or less | Several hundred microseconds or less | 100 mW or less |

As apparent from the above description, the present invention provides a thermo-optic switch in which input and output tapers are arranged at input and output terminals of the thermo-optic switch, respectively, thereby minimizing the coupling loss of a light input to the thermo-optic switch via an optical fiber. In the thermo-optic switch of the present invention, electrodes are spaced apart from a heat sink by a small distance of 15 $\mu$m or less. Accordingly, heat applied to (a) preparing a substrate, and etching portions of the substrate respectively corresponding to the input and output terminals;

(b) forming a lower clad layer over the substrate;

(c) forming an input taper and an output taper at portions of the lower clad layer respectively corresponding to the input and output terminals;

(d) forming a core layer over the lower clad layer formed with the input and output tapers;

(e) forming branched waveguides having a rib structure at the core layer in such a fashion that the branched waveguides are arranged between the input and output tapers;

(f) forming an upper clad layer over the core layer formed with the branched waveguides; and (g) forming switching electrodes on the upper clad layer.

4. The method according to claim 3, wherein the substrate prepared at the step (a) is a heat sink, and the heat sink is etched, at the step (a), to a depth of 10 to 15 $\mu$m at regions where the input and output tapers are to be arranged, respectively.

5. The method according to claim 3, wherein the lower clad layer formed at the step (b) is made of a material exhibiting a refractive index of 1 to 2% with respect to the core layer.

6. The method according to claim 3, wherein the upper clad layer formed at the step (f) is made of a material exhibiting a refractive index of 1 to 15% with respect to the core layer.

7. The method according to claim 3, wherein the step (g) comprises the steps of:

depositing a conductive metal film over the upper clad layer; and subjecting the conductive metal film to a photolithography and etching process, thereby forming the electrodes.

8. A thermo-optic switch having input and output terminals respectively connected to optical fibers, comprising:

a substrate having an input taper formed at a region corresponding to the input terminal and adapted to convert a circular mode, input from the optical fiber connected to the input terminal, into an oval mode having a rib shape, and an output taper formed at the region corresponding to the output terminal and adapted to convert the oval mode into a circular mode allowed to be input to the optical fiber connected to the output terminal;

a lower clad layer formed over the substrate;

a core layer formed over the lower clad layer and provided with branched waveguides having a rib structure, the branched waveguides selectively receiving the oval mode from the input taper and outputting the received oval mode to the output taper;

an upper clad layer formed over the core layer; and switching electrodes formed on the upper clad layer and selectively activated to apply heat to an associated one of the branched waveguides in such a fashion that an effective refractive index difference occurs between the branched waveguides, thereby causing the branched waveguides to selectively receive the oval mode from the input taper.

9. The thermo-optic switch according to claim 8, wherein the substrate is a heat sink etched to a depth of 10 to 15 $\mu$m at regions respectively corresponding to the input and output terminals, so that it is formed with the input and output tapers.

10. A method for manufacturing a thermo-optic switch having input and output terminals, comprising the steps of:

(a) preparing a substrate, and forming an input taper and an output taper at portions of the substrate respectively corresponding to the input and output terminals;

(b) forming a lower clad layer over the substrate;

(c) forming a core layer over the lower clad layer;

(d) forming branched waveguides having a rib structure at the core layer in such a fashion that the branched waveguides are arranged between the input and output tapers;

(e) forming an upper clad layer over the core layer formed with the branched waveguides; and (f) forming switching electrodes on the upper clad layer.

11. The method according to claim 10, wherein the substrate prepared at the step (a) comprises the step of:

etching the portion of the substrate corresponding to the input terminal to a depth of 10 to 15 $\mu$m, thereby forming the input taper; and etching the portion of the substrate corresponding to the output terminal to a depth of 10 to 15 $\mu$m, thereby forming the output taper.

12. The method according to claim 10, wherein the step (b) comprises the steps of:

loading the substrate formed with the input and output tapers in a heating furnace, heating the interior of the heating furnace to a temperature 1,000 to 2,000° C. while blowing oxygen into the interior of the heating furnace, thereby forming an oxygen atmosphere in the heating furnace; and maintaining the substrate for a desired period of time until an $SiO_2$ layer is formed to a thickness of 1.5 to 5 $\mu$m over the substrate, thereby forming the lower clad layer.

13. The method according to claim 10, wherein the lower clad layer formed at the step (C) is made of a material exhibiting a refractive index of 1 to 2% with respect to the core layer.

14. The method according to claim 10, wherein the upper clad layer formed at the step (e) is made of a material exhibiting a refractive index of 1 to 15% with respect to the core layer.

15. The method according to claim 10, wherein the step (f) comprises the steps of:

depositing a conductive metal film over the upper clad layer; and subjecting the conductive metal film to a photolithography and etching process, thereby forming the electrodes.

16. A method for changing an optical line using a thermo-optic switch having input and output tapers respectively coupled to optical fibers, branched waveguides having a rib structure arranged between the input and output tapers, and electrodes adapted to allow the branched waveguides to be selectively switched to the input and output tapers, comprising the steps of:

(a) converting a circular mode, input from the input taper-end optical fiber to the input taper, into an oval mode having a rib shape;

(b) activating a selected one of the electrodes, thereby generating heat from the selected electrode, and transferring the heat to a selected one of the branched waveguides in the vicinity of a branching point of the waveguides, at which the waveguides are coupled to the input taper, thereby switching the optical line for the oval mode to the branched waveguide, to which no heat is applied, by virtue of a mode evolution; and (c) changing the oval mode having the rib shape into a circular mode, corresponding to the output taper-end optical fiber, during a passage of the oval mode through the output taper.

17. The method according to claim 16, wherein a coupling loss generated at the step (a) due to the coupling of the input taper to the associated optical fiber is 0.5 dB/facet or less.

18. The method according to claim 16, wherein the step (b) further comprises the steps of:

deactivating the activated electrode, and discharging the heat transferred to the heat-transferred waveguide into a heat sink attached to the thermo-electric switch; and activating the other electrode simultaneously with the electrode deactivation in such a fashion that heat is generated from the activated other electrode and transferred to the other waveguide, thereby switching the optical line for the oval mode to the heat-discharged waveguide.

19. The method according to claim 16, wherein a coupling loss generated at the step (c) due to the coupling of the output taper to the associated optical fiber is 0.5 dB/facet or less.

* * * * *